Feb. 26, 1963 E. NEUMAN 3,078,604
SNOW SHOVEL WITH OFFSET HANDLE AND SKIDS
Filed March 6, 1962
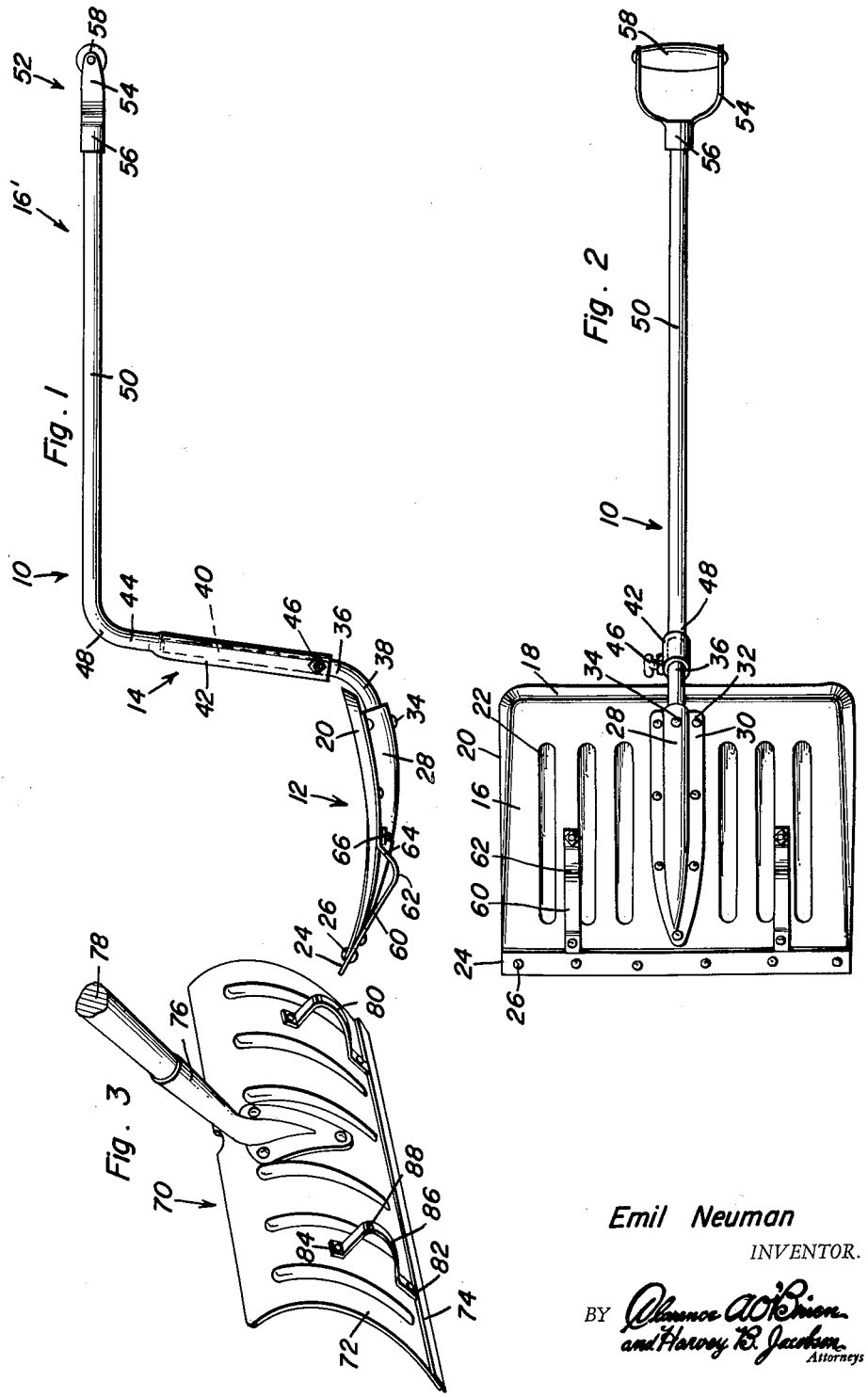
Emil Neuman
INVENTOR.

United States Patent Office 3,078,604
Patented Feb. 26, 1963

3,078,604
SNOW SHOVEL WITH OFFSET HANDLE
AND SKIDS
Emil Neuman, Wilber, Nebr.
Filed Mar. 6, 1962, Ser. No. 177,862
2 Claims. (Cl. 37—53)

The present invention generally relates to a snow shovel construction and more particularly to such a shovel having an upwardly offset handle together with a novel skid assembly for facilitating the shoveling or pushing of snow.

The primary object of the present invention is to provide a snow shovel having a handle assembly with an upwardly offset portion adjacent the rear edge of the shovel thereby enabling a person to use the shovel without bending down to grasp the shovel handle adjacent the rear edge of the shovel itself thereby greatly reducing the effort required in shoveling snow and at the same time reducing the incidents of backaches and fatigue caused by repeated bending over such as is required to operate a conventional shovel of this type.

Another object of the present invention is to provide a snow shovel in accordance with the preceding objects in which the forward edge portion of the shovel is provided with a pair of skids which diverge away from the bottom surface of the shovel to provide runners for the shovel so that in the event the leading or forward edge of the shovel engages an obstruction such as an uneven joint in a concrete walkway or the like, the handle of the shovel may be merely depressed thus rocking or fulcruming the shovel about a fulcrum point formed by the skids thereby elevating the leading edge of the shovel above the obstruction so that it may be again moved forwardly in a manner which enables normal use of the shovel thereby enabling the shoveling operation to be carried out without lifting the shovel several times during a shoveling operation such as would be required if a conventional shovel were used and an obstruction engaged.

Another object of the present invention is to provide a snow pusher also provided with a skid assembly which enables the pusher to be rocked or fulcrumed in substantially the same manner as the snow shovel with the skids on the pusher having a different angle of divergence in relation to the bottom or rear surface of the pusher thereby enabling the pusher to be more effectively employed for pushing snow off of a walk or the like.

Still another important object of the present invention is to provide a snow shovel in accordance with the preceding objects having an upwardly offset handle in which the upwardly offset portion of the handle is telescopically adjustable thus enabling the length of the offset portion of the handle to be adjusted so that individual users of the shovel may orientate the portion of the handle which is grasped to be orientated at the optimum elevation in relation to the portion of the shovel which actually engages and lifts the snow.

Still another feature of the present invention is to provide a snow shovel having an offset handle assembly together with skids on the bottom surface thereof in which the load constituted by the snow on the shovel will hang from the upper end of the offset portion where the handle is normally grasped substantially in the nature of a pendulum thus eliminating tilting and undesired dumping of the snow from the shovel during the initial lifting operation but yet which will start the dumping operation as the shovel is swung laterally thereby facilitating the shoveling operation.

Another very important object of the present invention is to provide a snow shovel or pusher assembly each including skids and the shovel including an offset handle that is simple in construction, easy to use, efficient in operation, effective in reducing the effort and fatigue caused by snow shoveling and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the snow shovel of the present invention;

FIGURE 2 is a bottom plan view of the construction of FIGURE 1;

FIGURE 3 is a rear perspective view of a snow pusher illustrating the skids attached thereto.

Referring now specifically to FIGURES 1 and 2, the numeral 10 generally designates the snow shovel of the present invention which includes a shovel member generally designated by the numeral 12, an offset handle portion 14 and a handle portion 16 which is grasped when the shovel is being used.

The shovel 12 includes an arcuate sheet metal scoop or member 16' which is straight transversely but arcuate longitudinally and provided with an upstanding angulated flange 18 at the rear edge thereof and a corresponding flange 20 at each side edge thereof which tapers and merges with the arcuate member 16. Longitudinal reinforcement ribs 22 are formed in the arcuate member 16. This portion of the shovel is conventional and may be preferably constructed of sheet metal such as sheet steel, galvanized metal or the like but preferably is constructed of aluminum of a requisite gauge that is corrosive resistant but still lightweight. The forward edge or leading edge of the arcuate member 16 is provided with a reinforcement plate or blade 24 secured in position by rivets or fasteners 26 with the plate 24 serving as a reinforcement for the top edge of the aluminum arcuate member 16 and also providing means for cutting into the snow and this is especially desirable when used with partially frozen material. The actual construction of the shovel itself is more or less conventional and the rear surface thereof is provided with an arcuate sleeve 28 having outwardly extending flanges 30 attached to the arcuate member 16 by suitable fasteners such as rivets 32. With this construction, the offset portion of the handle assembly is received in and fastened in the sleeve 28 by suitable fastening means such as a rivet or bolt 34.

Normally, the shovel handle would extend straight back from the shovel 12 but in this instance the offset portion of the handle 14 includes a rod or member 36 having a bend 38 at the lower end thereof which slides into the sleeve 28. Extending upwardly from the bend 38 is a straight portion 40 which is telescopically received in a downwardly extending sleeve or straight portion 42 of an upper member 44 which also forms a portion of the offset 14. A setscrew 46 or any other adequate clamping means is provided for securing the portions 40 and 42 in longitudinally telescopic relation for effectively adjusting the distance between the bend 38 at the lower end of the lower member 36 and the bend 48 at the upper end thereof. The bend 48 is contiguous with an elongated straight main handle portion 50 having loop type hand grip generally designated by numeral 52 at the outer end thereof. The hand grip 52 includes a U-shaped member 54 having a central sleeve 56 received on the member 50 together with a transverse rotatable hand grip member 58 disposed between and attached to the legs of the U-shaped member 54.

In practical operation, it has been found that the included angle defined by the bend 38 is preferably 100° while the included angle defined by the bend 48 is 98° thus orientating the main handle 50 slightly in an upward divergence in relation to the ground surface when the snow shovel is being used. Normally, the length of the main handle 50 will be of such a length to enable an average person to grasp the hand grip 58 with one hand and place the other hand adjacent the bend 48 so that the area of the bend 48 will form the lift and fulcrum point for the shovel. By adjusting the telescopic connection by loosening and tightening the setscrew 46, the vertical position of the fulcrum area may be orientated to the optimum position for each individual user depending upon their height thus enabling the shovel to be employed with the least possible bending over thereby reducing backache and fatigue caused by such bending.

Inasmuch as the lifting force is exerted above the plane of the shovel, there will be less tendency of the shovel to tilt sideways in the event one edge portion of the shovel is engaged with some obstruction such as frozen material or the like. Additionally, the application of lifting force will cause the shovel to act somewhat as a pendulum so that as the lifting point is swung laterally, the shovel will start to swing and at the same time pivot towards a dumping position thus enabling the dumping operation to more easily be carried out by continuing to pivot the shovel in the direction in which it normally starts due to the lateral movement of the lifting point of the shovel at a higher rate of speed than the shovel itself.

Disposed under the forward or leading edge portion of the arcuate member 16 forwardly of the center of gravity thereof is a pair of skids, rockers or runners 60 each of which has the forward end abutting the plate 24 and which has a downwardly spaced apex portion 62 spaced from the bottom surface of the arcuate member 16. The apex portion is contiguous with an inwardly extending portion 64 attached to the arcuate member 16 by fastener bolts or rivets 66 or the like. Also the forward ends of the skids 60 are attached in a similar manner. Thus, the skids are disposed substantially tangential to the arcuate member 16 at the leading edge thereof and diverge from the arcuate member in a rearward manner thus providing a fulcrum point at the apex 62 so that the shovel 12 may be fulcrumed about the apices 62 of the skids or runners 60. This will enable normal operation of the shovel at the proper angle of inclination so that the blade or plate 24 scrapes along the surface being cleaned. However, if an obstruction is encountered such as an uneven joint in a concrete walk or any other solid obstruction, it is only then necessary to lower the hand grip 58 thus fulcruming the shovel about the apices 62 thus elevating the blade or plate 24 above the obstruction for enabling the shovel then to be moved in the same manner by the application of longitudinal force on the main handle 50.

Referring now specifically to FIGURE 3, there is disposed a snow pusher generally designated by the numeral 70 having an arcuate member 72 of the same material as the snow shovel and which also is of conventional construction and provided with a reinforcing blade or plate 74 thereon together with a handle receiving sleeve 76 which receives an elongated rigid handle 78 which is straight. The snow pusher is provided with a pair of skids, rockers or runners 80 on the bottom surface thereof which have a forward end 82 secured to the pusher by suitable fasteners together with a rear end 84 also secured thereto. The central portions 86 of the runners 80 extend downwardly to define apices 88 which define fulcrum points when the snow pusher engages an obstruction such as an uneven joint in a sidewalk or the like so that by downward movement of the handle 78 the skids 80 will be brought into supporting engagement with a supporting surface and the pusher rocked about the apices 88 thus elevating the blade or plate 74 above such an obstruction thus enabling more effective use of the pusher and eliminating the necessity of lifting the pusher blade above such an obstruction.

The skid structures may be of any suitable material such as strap metal or bars of a desired thickness having outwardly angularly bent end portions and also, the offset handle structure may be of any suitable material such as tubular metallic material or solid wood with tubular telescopic metal fittings depending upon the particular desires of the manufacturer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A snow shovel comprising a scoop, a rod secured beneath the rear portion of said scoop and including an upstanding rear end portion, and elongated handle comprising a downwardly bent forward end portion provided with a depending sleeve thereon, said forward end portion of the handle being approximately normal to the rearward end thereof and said sleeve telescopically receiving said rear end portion of the rod for mounting the handle on the scoop for rotary and vertical adjustment relatively thereto, and a setscrew threadedly mounted in the sleeve and engaged with the rod for securing the handle in rotary and vertically adjusted position.

2. A snow shovel in accordance with claim 1, together with a blade secured transversely beneath the forward portion of the scoop and projecting forwardly therefrom for contact with a surface from which snow is to be removed, and rockers for the scoop secured longitudinally beneath the forward portion thereof and including forward ends abutting the rear edge of the blade.

References Cited in the file of this patent

UNITED STATES PATENTS

| | | |
|---|---|---|
| 172,632 | Kennedy | Jan. 25, 1876 |
| 815,122 | Schaffert | Mar. 13, 1906 |
| 1,930,000 | Bulger | Oct. 10, 1933 |
| 2,484,409 | Jameson | Oct. 11, 1949 |
| 2,571,244 | Hollander | Oct. 16, 1951 |
| 2,572,230 | Williams | Oct. 23, 1951 |
| 2,734,291 | Lasker | Feb. 14, 1956 |

FOREIGN PATENTS

| | | |
|---|---|---|
| 8,426 | Switzerland | of 1894 |
| 31,276 | Norway | of 1920 |